United States Patent
Devegowda et al.

(10) Patent No.: US 9,092,369 B2
(45) Date of Patent: Jul. 28, 2015

(54) TRACKING SPECIFIC JAVA NATIVE INTERFACE INVOCATIONS OF SYSTEM AND LIBRARY CALLS

(71) Applicant: International Business Machines Corporation, Armonk, NY (US)

(72) Inventors: Amar Devegowda, Bangalore (IN); Venkataraghavan Lakshminarayanachar, Bangalore (IN); Sathiskumar Palaniappan, Namakkal (IN); Anshu Verma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 13/664,529

(22) Filed: Oct. 31, 2012

(65) Prior Publication Data
US 2014/0122939 A1    May 1, 2014

(51) Int. Cl.
*G06F 9/44* (2006.01)
*G06F 11/14* (2006.01)

(52) U.S. Cl.
CPC ..................................... *G06F 11/14* (2013.01)

(58) Field of Classification Search
USPC ......................................................... 717/128
See application file for complete search history.

(56) References Cited

U.S. PATENT DOCUMENTS

| | | | |
|---|---|---|---|
| 6,662,362 B1 * | 12/2003 | Arora et al. ................... | 717/154 |
| 7,818,721 B2 | 10/2010 | Sundararajan et al. | |
| 7,870,541 B1 | 1/2011 | Deshpande | |
| 2006/0242627 A1 * | 10/2006 | Wygodny et al. ............. | 717/128 |
| 2008/0244534 A1 | 10/2008 | Golender et al. | |
| 2010/0095278 A1 | 4/2010 | Nageshappa et al. | |
| 2011/0126172 A1 | 5/2011 | Lakshminarayanachar et al. | |

OTHER PUBLICATIONS

IBM, "Method for contextual 'instance' specific event trace within a Java Virtual Machine", http://ip.com/IPCOM/000185154, Jul. 14, 2009.
"Automating Traversal of Function Call Graphs contained in Program Execution", http://ip.com/IPCOM/000198336, Aug. 5, 2010.

* cited by examiner

*Primary Examiner* — Hang Pan
(74) *Attorney, Agent, or Firm* — Jordan IP Law, LLC

(57) ABSTRACT

Methods and systems may track the invocation path of a system or a library call from Java native interface (JNI) in Java applications. A native call of interest having an associated failure condition, an invocation path associated with the native call of interest, and a Java boundary crossover method (Java method invoking a JNI method) within the invocation path may all identified based on failure diagnostic information. The identified information may also be fed to a Java virtual machine (JVM). When the application is re-run, a check can be made prior to execution of the JNI method, as to whether the Java boundary crossover method is being executed. If so, then the execution stack may be compared to the invocation path of interest.

19 Claims, 2 Drawing Sheets

TRACKING SPECIFIC JAVA NATIVE INTERFACE INVOCATIONS OF SYSTEM AND LIBRARY CALLS

BACKGROUND

Embodiments of the present invention may generally relate to application debugging. More particularly, embodiments relate to tracking specific Java native interface (JNI) invocations of system and library calls.

Software applications such as Java applications may execute in the context of a Java virtual machine (JVM), which can offer the ability to execute both Java methods and invoke native methods (e.g., C/C++ methods) using JNI. There may be numerous issues experienced at the JNI layer that necessitate contextual tracing for optimal results. For instance, if a JNI method invokes a native method that in turn invokes a system or library call, when the system/library call fails a relatively large amount of debugging instrumentation may be required to understand which parameters were passed to the system/library call and why it failed. Indeed, existing tracing techniques may trace all invocation sequences of the native method in such a case, which can lead to the generation of unnecessary trace data, adverse performance impacts at runtime, and timing difficulties that may even prevent the problem from being recreated. These challenges may be particularly pronounced in the context of complex enterprise applications and production environments.

BRIEF SUMMARY

Embodiments may include a computer program product having a computer readable storage medium and computer usable code stored on the computer readable storage medium. If executed by a processor, the computer usable code may cause a computer to identify a call of interest having an associated failure condition and identify an invocation path associated with the call of interest, wherein the invocation path includes a Java boundary crossover method. The computer usable code can also cause a computer to determine trace information that is dedicated to the invocation path.

Embodiments may also include a computer implemented method that provides for identifying a call of interest having an associated failure condition, wherein the call of interest includes one or more of a system call and a library call. Additionally, an invocation path associated with the call of interest may be identified, wherein the invocation path includes a Java boundary crossover method having a Java application programming interface (API) call to a Java native interface (JNI) call and a native method call to the call of interest. The method can also involve detecting an execution of the crossover method and comparing an execution stack to the invocation path in response to the execution of the crossover method. In addition, a trace flag may be set if the execution stack satisfies a condition with respect to the invocation path, wherein the trace flag enables trace information associated with the call of interest, which may need to be printed/reported. The trace flag corresponds to a thread associated with the execution of the crossover method.

Embodiments may include a computer program product having a computer readable storage medium and computer usable code stored on the computer readable storage medium. If executed by a processor, the computer usable code may cause a computer to identify a call of interest having an associated failure condition, wherein the call of interest is to include one or more of a system call and a library call. Additionally, the computer usable code can cause a computer to identify an invocation path associated with the call of interest, wherein the invocation path is to include a Java boundary crossover method having a Java API call to a JNI call and a native method call to the call of interest. The computer usable code may also cause a computer to detect an execution of the crossover method and compare an execution stack to the invocation path in response to the execution of the crossover method. In addition, the computer usable code may cause a computer to set a trace flag if the execution stack satisfies a condition with respect to the invocation path to print/output trace information of the call of interest, wherein the trace flag corresponds to a thread associated with the execution of the crossover method.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
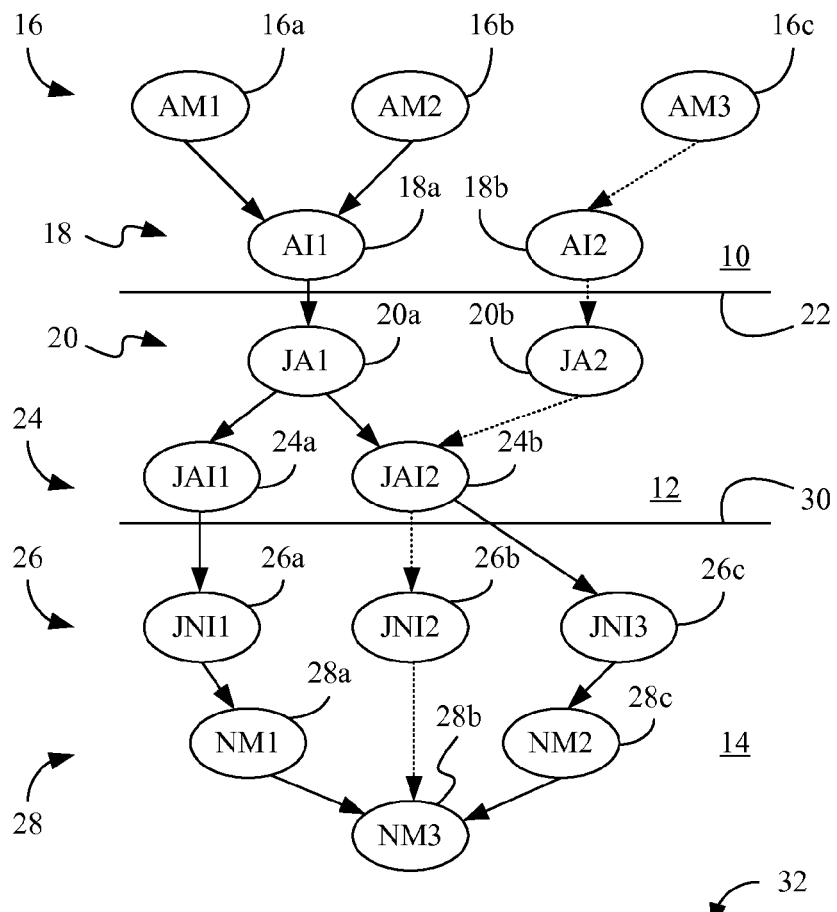
FIG. 1 is a block diagram of an example of a software application architecture according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a software application architecture is shown, wherein the architecture includes an application layer 10, a Java application programming interface (API) layer 12 and a native layer 14. In the illustrated example, the application layer 10 includes application methods 16 (16a-16c; "AM1" to "AM3", respectively) as well as application interface methods 18 (18a, 18b; "AI1" and "AI2", respectively), wherein the application methods 16 may invoke/call the application interface methods 18 during execution of the software application. For example, the application methods 16a and 16b may each invoke the application interface method 18a, whereas the application method 16c may invoke the application interface method 18b.

The Java API layer 12 may include Java application methods 20 (20a, 20b; "JA1" and "JA2", respectively) and Java application interface methods 24 (24a and 24b; "JAI1" and "JAI2", respectively), wherein the application interface methods 18 of the application layer 10 may invoke the Java application methods 20 across an application boundary 22. Thus, in the illustrated example, the application interface method 18a invokes the Java application method 20a and the application interface method 18b invokes the Java application method 20b. Additionally, the Java application methods 20 can invoke the Java application interface methods 24, wherein the Java application method 20a invokes both of the Java application interfaces 24a, 24b and the Java application method 20b invokes only the Java application interface 24b.

The native layer 14 may include Java native interface (JNI) methods 26 (26a-26c; "JNI1" to "JNI3", respectively) as well as native methods 28 (28a-28c; "NM1" to "NM3", respectively), wherein the Java application interface methods 24 can invoke the JNI methods 26 across a Java boundary 30. For example, the Java application interface method 24a might invoke the JNI method 26a, and the Java application interface 24b could invoke both of the JNI methods 26b and 26c. Moreover, the JNI methods 26 may invoke the native methods 28 either directly or indirectly through other native methods 28, in the example shown. Thus, the illustrated JNI method 26a invokes the native method 28b indirectly through the native method 28a, and the illustrated JNI method 26c invokes the native method 28b indirectly through the native method 28c. The JNI method 26b, on the other hand, may invoke the native method 28c directly. The native methods 28 may include system calls and/or library calls, wherein such calls may implemented in a non-Java native language such as C and/or C++.

In the illustrated example, a failure condition is encountered upon the execution of the native method 28b, but only when the native method 28b is invoked along the path having dashed lines—namely, the path including the application method 16c, the application interface method 18b, the Java application method 20b, the Java application interface method 24b, the JNI method 26b and the native method 28b. Of particular note is that to trace all invocation paths leading to the native method 28b may result in the generation of massive amounts of trace data, particularly in the context of complex enterprise applications and production environments. Indeed, the failure condition could be due to dependent modules/methods/global fields and/or variables/objects that are in any of the invocation paths shown. Moreover, while isolation of specific invocation paths may be traditionally achievable purely within the Java API layer 12, the invocation of methods across the Java boundary 30 and into the native layer 14 can present challenges with regard to diagnosing failure conditions. As will be discussed in greater detail, techniques described herein can provide for determining the invocation path associated with the failure condition and generating trace information only for that invocation path, even though the invocation path includes native method calls 28 in addition to JNI methods 26, Java application interface methods 24, Java application methods 20, application interface methods 18 and application methods 16.

Figure 2A:
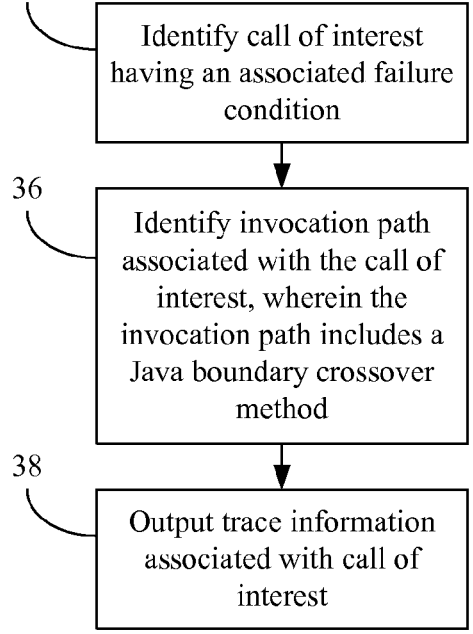
FIG. 2A is a flowchart of an example of a method of debugging an application having a Java boundary according to an embodiment.

FIG. 2A shows a method 32 of debugging an application. Illustrated processing block 34 provides for identifying a call of interest having an associated failure condition. For example, consider the execution stack shown below in Table I.

TABLE I

| Method | Comment |
| --- | --- |
| 1 gnu/testlet/SingleTestHarness.getResourceStream | << Application call |
| 2 java/io/FileInputStream.<init> | << JDK Java call |
| 3 java/io/FileInputStream.<init> | << JDK Java call |
| 4 java/io/FileInputStream.open | << JDK Java call |
| 5 Java__java_io_FileInputStream_open | << JNI method |
| 6 java!fileOpen | << native method |
| 7 java!JCL__CreateFileW | << native method |
| 8 msvcr100!wcstoui64__l | << system call |

In the example of Table I, a set of Java methods invoke a set of native methods culminating in an invocation to the system call "wcstoui64__1". Thus, processing block 34 may identify wcstoui64__1 as a call of interest. Illustrated block 36 provides for identifying an invocation path associated with the call of interest, wherein the invocation path includes a Java boundary crossover method. A Java boundary crossover method may be defined as a Java API call to/invocation of a JNI call/method. Thus, in the example of Table I, the Java boundary crossover method would constitute the bolded combination of item #4 and item #5 (i.e., java/io/FileInputStream.open→Java_java_io_FileInputStream_open). Block 38 may provide for determining trace information that is dedicated to the invocation path. Thus, if the system call wcstoui64__1 fails only under this invocation path/sequence, other invocations of that system call can be eliminated from the trace information.

Figures 2B, 3:
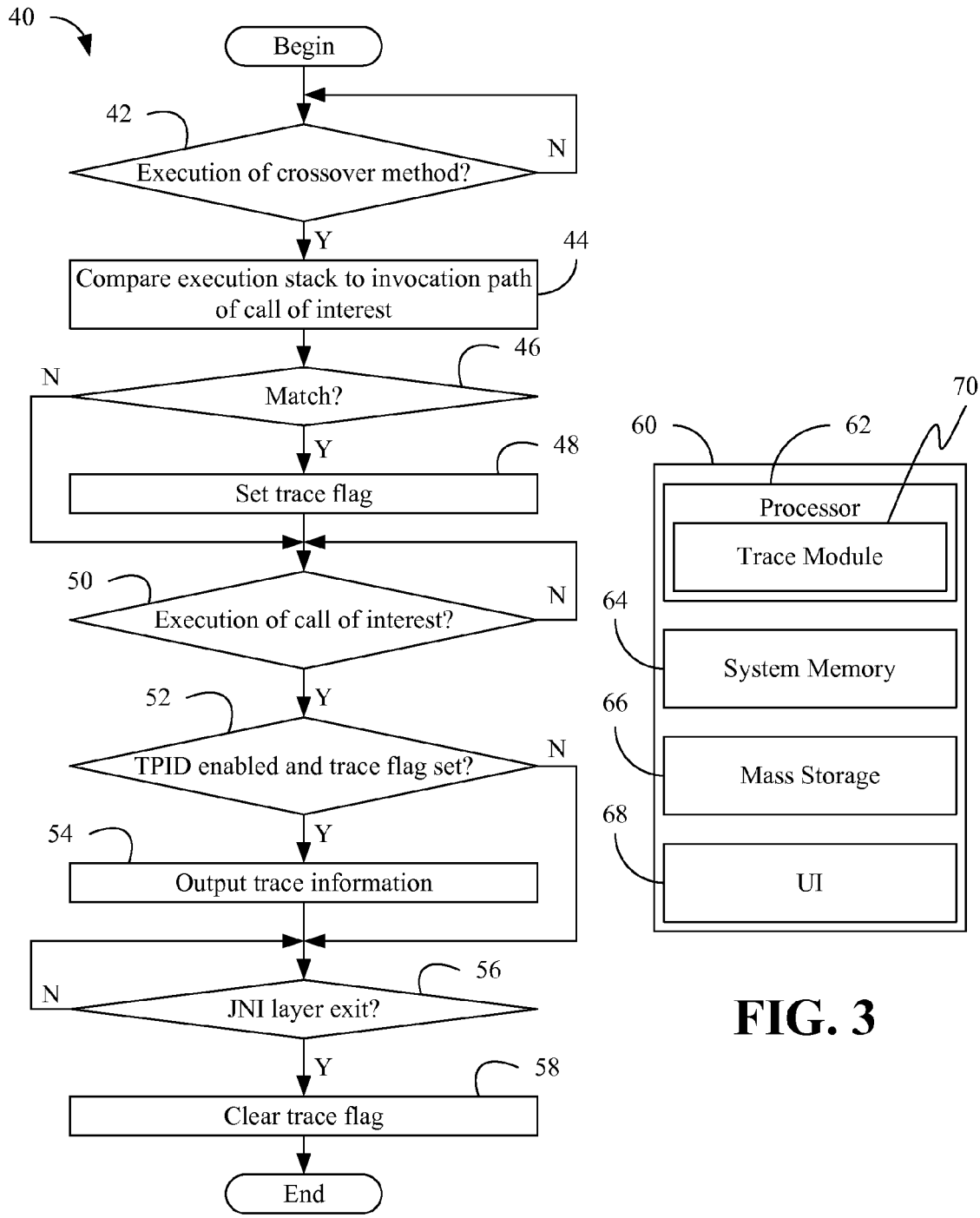
FIG. 2B is a flowchart of an example of a method of determining trace information according to an embodiment.
FIG. 3 is a block diagram of an example of a computing system according to an embodiment.

FIG. 2B shows a method 40 of determining trace information for an invocation path having a call of interest and a Java boundary crossover method with a Java API call to a JNI call. The method 40 may therefore be readily substituted for block 38 (FIG. 2A), already discussed. In one example, the method 40 is implemented in a Java virtual machine (JVM), wherein the invocation path may be identified based on the failure condition and passed to the JVM along with a tpid (trace point id) of the native method that invokes the call of interest. Note, trace point ids may represent the system/library calls in order to output trace information for specific methods using the JVM's trace engine. Illustrated processing block 42 determines whether an execution of the crossover method has occurred. If the execution of the crossover method is detected, block 44 may compare an execution stack to the invocation path of the call of interest. If it is determined at block 46 that a match condition is satisfied (e.g., execution stack matches the invocation path), a trace flag (e.g., mark_thread_fortrace) may be set at block 48, wherein the trace flag corresponds to a thread associated with the execution of the crossover method. Thus, the trace flag may be set by simply altering the structures that represent the thread either at the JVM level or at the platform level (e.g., using a pthread_key_create( ) API) in order to ensure that the trace information is thread specific. If the match condition is not satisfied, the setting of the trace flag may be bypassed.

Illustrated block 50 determines whether an execution of the call of interest has occurred. If the execution of the call of interest is detected, block 52 may determine whether the trace engine (e.g., running as part of the JVM) may determine whether the tpid is enabled for this method and whether the trace flag is set. If so, trace information may be output from the thread at block 54, wherein the trace information may include parameters passed and variables of interest in the invocation path. Otherwise, the output of the trace information may be bypassed. Accordingly, the trace information will be dedicated to the targeted invocation path, in the example shown. Additionally, block 56 may determine whether a program control exit from the JNI layer has occurred. If so, the trace flag may be cleared at block 58 to ensure that if the call of interest is invoked from some other path, it will not be traced.

Turning now to FIG. 3, a computing system 60 is shown in which specific JNI invocations of system and library calls can be tracked. In the illustrated example, the system 60 includes a processor 62, system memory 64 (e.g., volatile memory, random access memory/RAM), mass storage 66 (e.g., non-volatile memory, hard disk drive/HDD, optical drive), and a user interface (UI) device 68. A module 70 may determine if the tpid is enabled for the native method that invokes the call of interest.

Techniques described herein may therefore trace specific invocations of system or library calls from JNI methods, resulting in a lightweight, performance sensitive mechanism for paths of interest to be recognized by JVM and JNI layers. Additionally, a path of interest may be defined and tracked from Java to native levels culminating in the system call of interest. Once the path of interest is recognized, then specific traces may be triggered the system/library call to output the parameters passed to it as well as variables of interest in the native method invoking the system/library call. Isolating specific invocation paths as described herein can enable JNI based potential root causes to be eliminated from consideration while facilitating the focus of valuable resources on other potential root causes such as dependencies of the call of interest.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
identifying a call of interest having an associated failure condition, wherein the call of interest includes one or more of a system call and a library call;
identifying an invocation path associated with the call of interest, wherein the invocation path includes a Java boundary crossover method and a native method call to the call of interest, the Java boundary crossover method including a Java application programming interface (API) call to a Java native interface (JNI) call that invokes the native method call to the call of interest having the associated failure condition;
detecting an execution of the crossover method including the Java API call to the JNI call that invokes the native method call to the call of interest having the associated failure condition;
comparing an execution stack to the invocation path in response to detecting the execution of the crossover method to determine a match condition between the execution stack and the invocation path, wherein the execution stack includes a sequence of methods that form the entire execution stack and the invocation path includes a sequence of methods that form the entire invocation path; and
setting a trace flag if the match condition is satisfied between the execution stack and the invocation path to output trace information that is associated with the call of interest, wherein the match condition is satisfied when the entire execution stack matches the entire invocation path, and wherein the trace flag corresponds to a thread associated with the execution of the crossover method and is set ensure that the trace information is specific to the thread.

2. The method of claim 1, further including:
detecting an execution of the call of interest;
output the trace information from the thread in response to the execution of the call of interest only if the trace flag is set and if a trace point identifier (tpid) is enabled; and
bypass the output of the trace information from the thread if one or more of the trace flag is not set and the trace point identifier is not enabled.

3. The method of claim 2, further including:
detecting a program control exit from a JNI layer; and
clearing the trace flag in response to the program control exit.

4. The method of claim 1, further including:
passing the invocation path to a Java virtual machine (JVM) trace engine; and
identifying the invocation path based on the failure condition.

5. The method of claim 1, wherein the JNI call directly invokes the native method call to the call of interest having an associated failure condition.

6. The method of claim 1, wherein the JNI call indirectly invokes the native method call to the call of interest having an associated failure condition.

7. The method of claim 6, wherein the JNI call invokes an intermediate native method call that invokes the native method call to the call of interest having the associated failure condition.

8. The method of claim 1, wherein the entire execution stack and the entire invocation path include the same Java application method that invokes the same Java API call to the same JNI call that invokes the same native method call to the same call of interest.

9. A computer program product comprising:
a non-transitory computer readable storage medium; and
computer usable code stored on the non-transitory computer readable storage medium, wherein if executed by a processor, the computer usable code causes a computer to:
identify a call of interest having an associated failure condition, wherein the call of interest is to include one or more of a system call and a library call;
identify an invocation path associated with the call of interest, wherein the invocation path is to include a Java boundary crossover method and a native method call to the call of interest, the Java boundary crossover method to include a Java application programming interface (API) call to a Java native interface (JNI) call that is to invoke the native method call to the call of interest having the associated failure condition;
detect an execution of the crossover method including the Java API call to the JNI call that invokes the native method call to the call of interest having the associated failure condition;
compare an execution stack to the invocation path in response to the detection of the execution of the crossover method to determine a match condition between the execution stack and the invocation path, wherein the execution stack includes a sequence of methods that form the entire execution stack and the invocation path includes a sequence of methods that form the entire invocation path; and
set a trace flag if the match condition is satisfied between the execution stack and the invocation path to output trace information of the call of interest, wherein the match condition is satisfied when the entire execution stack matches the entire invocation path, and wherein the trace flag corresponds to a thread associated with the execution of the crossover method and is to be set to ensure that the trace information is specific to the thread.

10. The computer program product of claim 9, wherein the computer usable code, if executed, causes a computer to:
detect an execution of the call of interest;
output the trace information from the thread in response to the execution of the call of interest only if the trace flag is set and if a trace point identifier (tpid) is enabled; and
bypass the output of the trace information from the thread if one or more of the trace flag is not set or the trace point identifier is not enabled.

11. The computer program product of claim 10, wherein the computer usable code, if executed, causes a computer to:
detect a program control exit from a JNI layer; and
clear the trace flag in response to the program control exit.

12. The computer program product of claim 9, wherein the computer usable code, if executed, causes a computer to pass the invocation path to a Java virtual machine (JVM) trace engine.

13. The computer program product of claim 9, wherein the invocation path is to be identified based on the failure condition.

14. A computer program product comprising:
a non-transitory computer readable storage medium; and
computer usable code stored on the non-transitory computer readable storage medium, wherein if executed by a processor, the computer usable code causes a computer to:

identify a call of interest having an associated failure condition;

identify an invocation path associated with the call of interest, wherein the invocation path is to include a Java boundary crossover method and a native method call to the call of interest, the Java boundary crossover method to include a Java application programming interface (API) call to a Java native interface (JNI) call that is to invoke the native method call to the call of interest having the associated failure condition;

compare an execution stack to the invocation path to determine a match condition between the execution stack and the invocation path, wherein the execution stack includes a sequence of methods that form the entire execution stack and the invocation path includes a sequence of methods that form the entire invocation path; and output trace information that is associated with the call of interest if the match condition is satisfied between the execution stack and the invocation path, wherein the match condition is satisfied when the entire execution stack matches the entire invocation path.

15. The computer program product of claim 14, wherein the computer usable code, if executed, causes a computer to:

set a trace flag for a thread associated with the execution of the crossover method if the match condition is satisfied between the execution stack and the invocation path to ensure that the trace information is specific to the thread;

output the trace information from the thread in response to the execution of the call of interest only if the trace flag is set and if a trace point identifier (tpid) is enabled; and bypass the output of the trace information from the thread if one or more of the trace flag is not set and the trace point identifier is not enabled.

16. The computer program product of claim 14, wherein the computer usable code, if executed, causes a computer to:

detect a program control exit from a Java native interface (JNI) layer; and clear the trace flag in response to the program control exit.

17. The computer program product of claim 14, wherein call of interest is to include one or more of a system call and a library call.

18. The computer program product of claim 14, wherein the computer usable code, if executed, causes a computer to pass the invocation path to a Java virtual machine (JVM).

19. The computer program product of claim 14, wherein the invocation path is to be identified based on the failure condition.

* * * * *